United States Patent [19]

Metal et al.

[11] 4,413,183
[45] Nov. 1, 1983

[54] GAMMA CAMERA

[75] Inventors: Israel Metal, New York, N.Y.; Vincent Berluti, Jr., Southbury, Conn.

[73] Assignee: Raytheon Company, Lexington, Mass.

[21] Appl. No.: 221,225

[22] Filed: Dec. 29, 1980

[51] Int. Cl.³ .................................................. G01T 1/20
[52] U.S. Cl. .............................. 250/363 S; 250/366; 250/369
[58] Field of Search .................... 250/363 R, 366, 369

[56] References Cited

U.S. PATENT DOCUMENTS 3,914,611  10/1975  Stout ................................. 250/369
4,186,307  1/1980  Tanaka et al. ..................... 250/369

Primary Examiner—Alfred E. Smith
Assistant Examiner—Carolyn E. Fields
Attorney, Agent, or Firm—Richard M. Sharkansky; Joseph D. Pannone

[57] ABSTRACT

A gamma camera having an array of photodetectors arranged to locate a flash of light produced by a scintillator in response to an incident gamma ray photon. A current pulse is produced by each one of the photodetectors in response to each incident gamma ray photon, the amount of charge produced by each one of such photodetectors being a measure of the portion of the energy of the photon detected by such one of the photodetectors. Each integrator produces a voltage which rises from an initial reference level, typically ground potential, to a peak level, such peak voltage level being representative of the amount of charge in the current pulse and hence the peak level of such voltage is a measure of the portion of the energy of the photon detected by such one of the photodetector. The outputs of the integrators are combined to provide X and Y coordinate location signals. The output of the integrator is reset to the initial reference level a predetermined time after the production of the current pulse, such predetermined time corresponding to the time the integrator output is substantially at its peak voltage and has provided a measure of the portion of the energy level of the photon detected by such one of the photodetectors coupled thereto thereby enabling such integrator to properly respond to a current pulse produced by the photodetector in response to succeeding incident gamma ray photon.

5 Claims, 5 Drawing Figures

| TERMINALS | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| X COMBINER | NC | 12 + | 6 + | 12 + | 12 − | 6 − | 12 − | 6 + | 4 + | 3 + | 4 + | 6 + | NC | 6 − | 4 − | 3 − | 4 − | 6 − | NC |
| Y COMBINER | NC | 12 + | NC | 12 − | 12 − | NC | 12 + | 6 + | 12 + | NC | 12 − | 6 − | 6 − | 12 − | NC | 12 + | 6 + | 6 + |
| Z COMBINER | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − |
| E COMBINER | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − |

GAMMA CAMERA

BACKGROUND OF THE INVENTION

Cameras utilized in providing an image of a radioactive source are frequently composed of a scintillator crystal and a collimator for guiding radiant energy from the source to the scintillator crystal. An array of photomultipliers is positioned on the opposite side of the scintillator crystal for receiving a flash of light emitted by the crystal in response to the incident radiant energy. Typically, the measure of light energy received by each photomultiplier is obtained by integrating circuits coupled to each of the photomultipliers, the relative magnitudes of these energies serving to indicate the location of each of the light flashes on the crystal. The stored energy of each of the photomultipliers is converted to a signal suitable for combining with the signals obtained from the energies of the other photomultipliers. In particular, it is noted that a highly active source of high energy radiation rapidly illuminates the scintillator crystal with successive photons of high radiant energy such as the energy of x-rays or gamma rays. Such rapid illumination is useful in obtaining high resolution images of the source, provided that the electronic circuitry utilized in forming pulse signals from the energy obtained from the photomultipliers is capable of operating at a rate commensurate with the rate at which high energy photons are incident upon the scintillator crystal.

A problem arises because of the need for integrating the light energy from the flash of light obtained in response to each high energy photon, and because of the need for forming a suitable signal from the integrated energy to permit a combination of these signals for locating the positions of the flashes of light. More particularly, the light output from a typical NaI with thallium doping scintillator may be characterized by a period of approximately constant light output for approximately 150 nanoseconds (ns) followed by a fast decay mode with a time constant of 230 ns. There is, in addition a slow decay mode with a time constant of 1200 ns. The light pulse is typically converted into a current pulse by the photomultipliers. Approximately 90 percent of the light energy is collected by the photomultiplier tube in approximately 800 ns and, in response to such collected light energy a current pulse is produced. An integrator is fed by the current pulse to produce a pulse having an amplitude proportional to the energy in the current pulse. The integrator is typically a so called "leaky" integrator having a decay time constant adjusted so that the output pulse it produces peaks at 800 ns. after the start of the current pulse i.e. when about 90 percent of the light energy is collected by the photomultiplier. Since the high energy photons are sometimes received less than 1.5 to 2.0 nanoseconds apart it is necessary that the integration provided by the integrator be complete prior to the arrival of the next high energy photon to enable the camera to provide high image resolution and high count rate capability.

SUMMARY OF THE INVENTION

The foregoing problems are overcome and other aspects of the invention are provided by a gamma camera incorporating an electronic system in accordance with the invention wherein each photomultiplier is provided with its own integrator and pulse shaping circuit. In response to each photon impacting the scintillator crystal, a current pulse is produced by the photomultiplier tube. The total charge produced by the photomultiplier is proportional to the number of light photons produced by the scintillator and, hence, such total charge is proportional to the energy level of the photon impacting the scintillator crystal. An integrator is fed by the current pulse produced by the photomultiplier tube to integrate such current pulse and thereby provide a measure of the total charge produced by the photomultiplier tube. Typically, the current pulse has a time duration of 800 nano seconds (ns). It follows then that the integrator output will determine the total charge and hence the energy of the photon incident upon the crystal 800 ns after the commencement of the current pulse produced by the photomultiplier. Further, the current pulse typically peaks after about 100 ns. A peak detector is fed by the current pulse to detect the time of peaking of the current pulse. A timing means, typically a monostable multivibrator, is triggered by the peak detector to produce a timing pulse having a predetermined time duration, typically 700 ns, so that the trailing edge of the timing pulse occurs 800 ns after the commencement of the current pulse is produced by the photomultiplier. Since during the 800 ns period of time commencing at the start of the photomultiplier current pulse 90 percent of the light energy is collected by the photomultiplier the trailing edge of the timing pulse produced by the timing means is used as a trigger signal to reset the integrator after the 800 ns integrator period. In a preferred embodiment of the invention, the integrator includes a capacitor and a field effect transistor having source and drain electrodes connected in shunt across the capacitor. During the first 800 nanoseconds of the current pulse the field effect transistor provides an open circuit across the capacitor so that the integrator properly integrates the current pulse to produce an output voltage which rises from an initial, reference level, typically ground potential, to a peak level, such peak level being proportional to the amount of charge produced by the photomultiplier. At the end of the 800 nanoseconds the gate electrode of the field effect transistor is activated in response to the trailing edge of the timing pulse produced by the timing means to place the field effect transistor into a conduction and thereby short circuit the capacitor causing such capacitor to discharge so that the output of the integrator is reset to the initial reference level. In this way, the integrator is able to properly respond to a current pulse produced by the photodetector in response to a succeeding incident photon.

BRIEF DESCRIPTION OF THE DRAWINGS

The aforementioned features and other advantages of the invention are explained in the following description taken in connection with the accompanying drawings wherein.

DESCRIPTION OF THE PREFERRED EMBODIMENT

Figure 1:
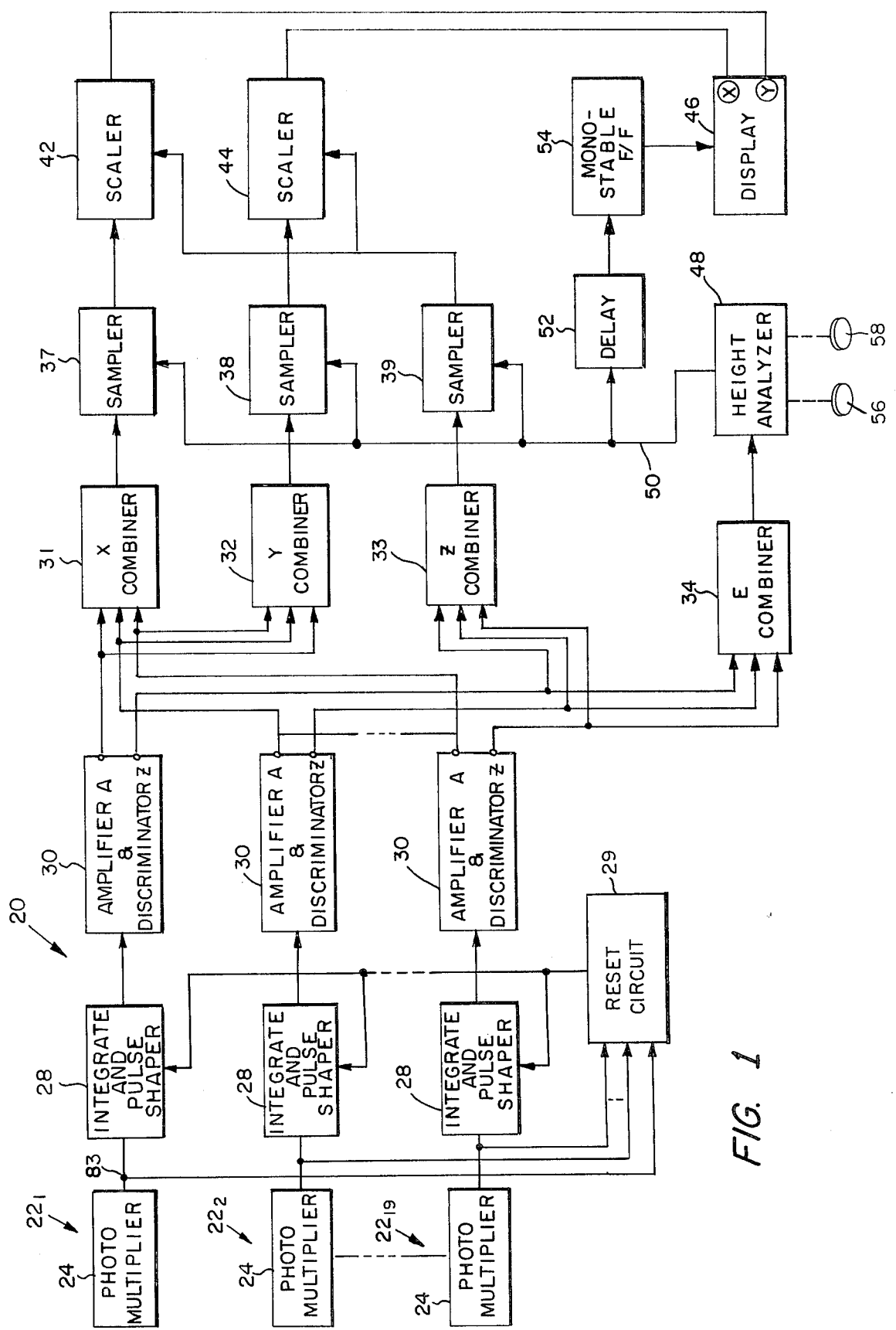
FIG. 1 is a block diagram of the camera system in accordance with the invention.

Referring now to FIG. 1, there is shown a block diagram of the electrical portion of a camera system 20 which comprises a plurality of, here nineteen, channels $22_1$–$22_{19}$, each channel 22 comprising a photomultiplier 24, an integrator and pulse shaper 28 and a discriminator 30 of the amplitudes of signals provided by the integrator and pulse shaper 28. Each of the channels $22_1$–$22_{19}$ is coupled to four combiners 31–34, the combiners 31–33 being coupled respectively to samplers 37–39. Output signals of the samplers 37 and 38 are scaled by scalers 42 and 44 and are applied respectively to the X and Y terminals of a display 46. The output of the combiner 34 is coupled to an analyzer 48 which analyzes the pulse height of signals from the combiner 34, the output of the analyzer 48 being applied along line 50 to trigger the samplers 37–39 as well as being coupled via a delay unit 52 for triggering a monostable flip-flop 54. The flip-flop 54 provides a gate to the display 46 for illuminating the display 46 after the signals in the samplers 37–38 have been scaled by the scalers 42 and 44.

In operation, the electrical portion of the camera system 20 provides for an image on the display 46 related to the signals provided by the photomultipliers 24 in each of the channels $22_1$–$22_{19}$ in the following manner. In each channel $22_1$–$22_{19}$ the photomultiplier 24 provides a current pulse corresponding to a flash of light incident upon the photomultiplier 24, each flash of light being produced in response to a corresponding gamma ray photon or x-ray photon impinging upon a scintillator crystal, to be described with reference to FIG. 2, which is placed in front of the photomultipliers 24. The flash represents the energy transferred from the gamma ray photon to the scintillator crystal and, accordingly, the signals provided by the photomultipliers 24 in response to the light flash are shaped by means of the integrator pulse shaping circuits 28 and then combine in combiners 31, 32, 33 to provide a measure of the energy, and relative position, of a gamma ray photon or x-ray photon impinging upon the scintillator crystal.

The integrator and pulse shaper 28 receives a current from the photomultiplier 24 coupled thereto in response to each incident gamma ray photon. The integrator and pulse shaper 28 integrates the current pulse and produces an output voltage which increases from an initial reference level, here ground, to a peak amplitude proportional to the amount of charge produced by the photomultiplier 24. The current pulses produced by the photomultipliers 24 in channels $22_1$–$22_{19}$ are monitored by a reset circuit 29, the details of which will be described in connection with FIG. 3. Suffice it to say here, however, that when the integrator and pulse shapers 28 have produced output voltages representative of the charge in the current pulses produced by the photomultipliers 24 a reset signal is produced by reset circuit 29 to reset the integrator and pulse shapers 28 so that the outputs thereof are reset to the initial reference level, here ground. In this way, such circuits 28 are enabled to properly respond to a current pulse produced in response to the next succeeding gamma ray photon.

The waveform signals produced by the integrator and pulse shapers 28 in each of the channels $22_1$–$22_{19}$ are suitable for being arithmetically combined for providing information with respect to the position of an impact of a gamma ray photon upon the scintillator crystal.

Figure 2:
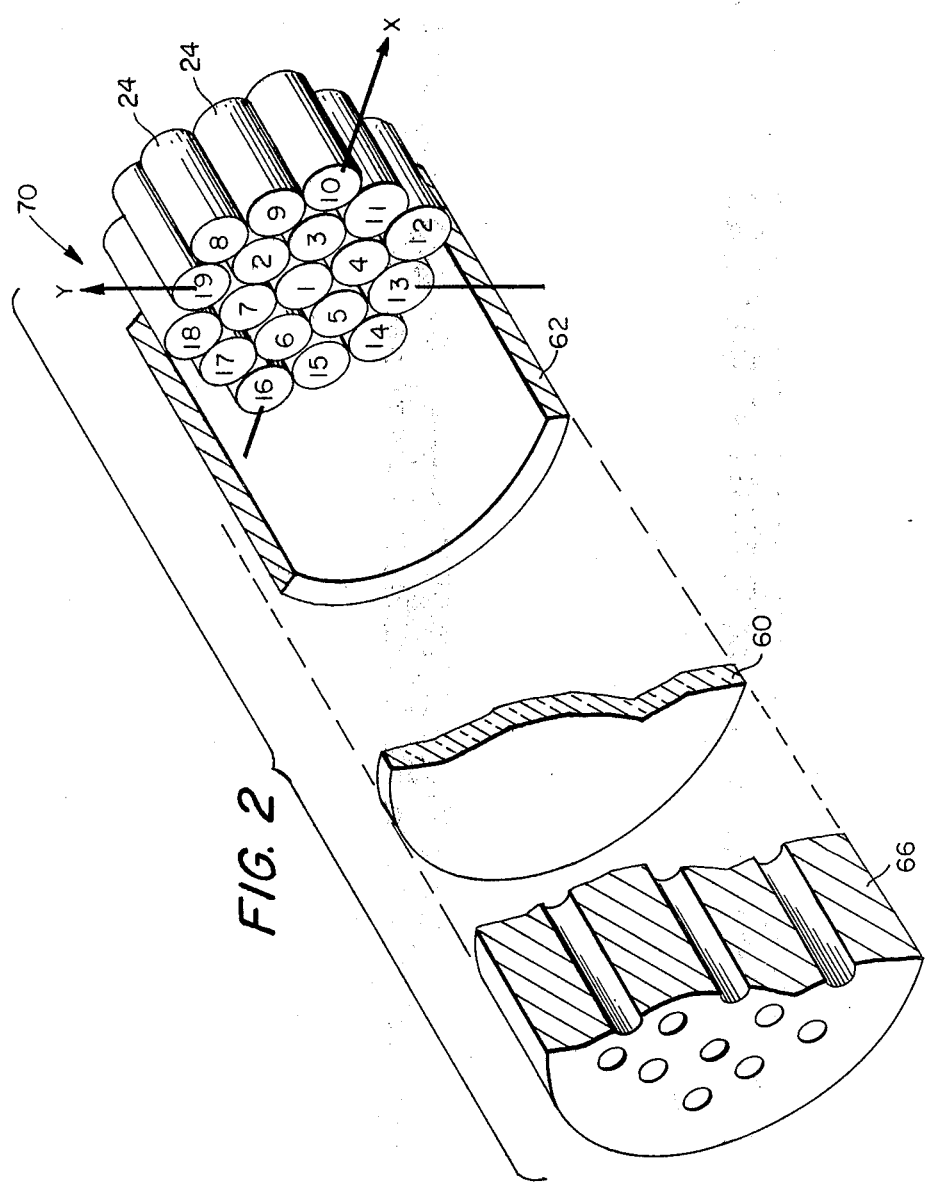
FIG. 2 is an exploded view of an assembly of the photomultipliers referred to in FIG. 1 showing the position of the photomultipliers in relation to a scintillator crystal and a collimator.
Figure 3:
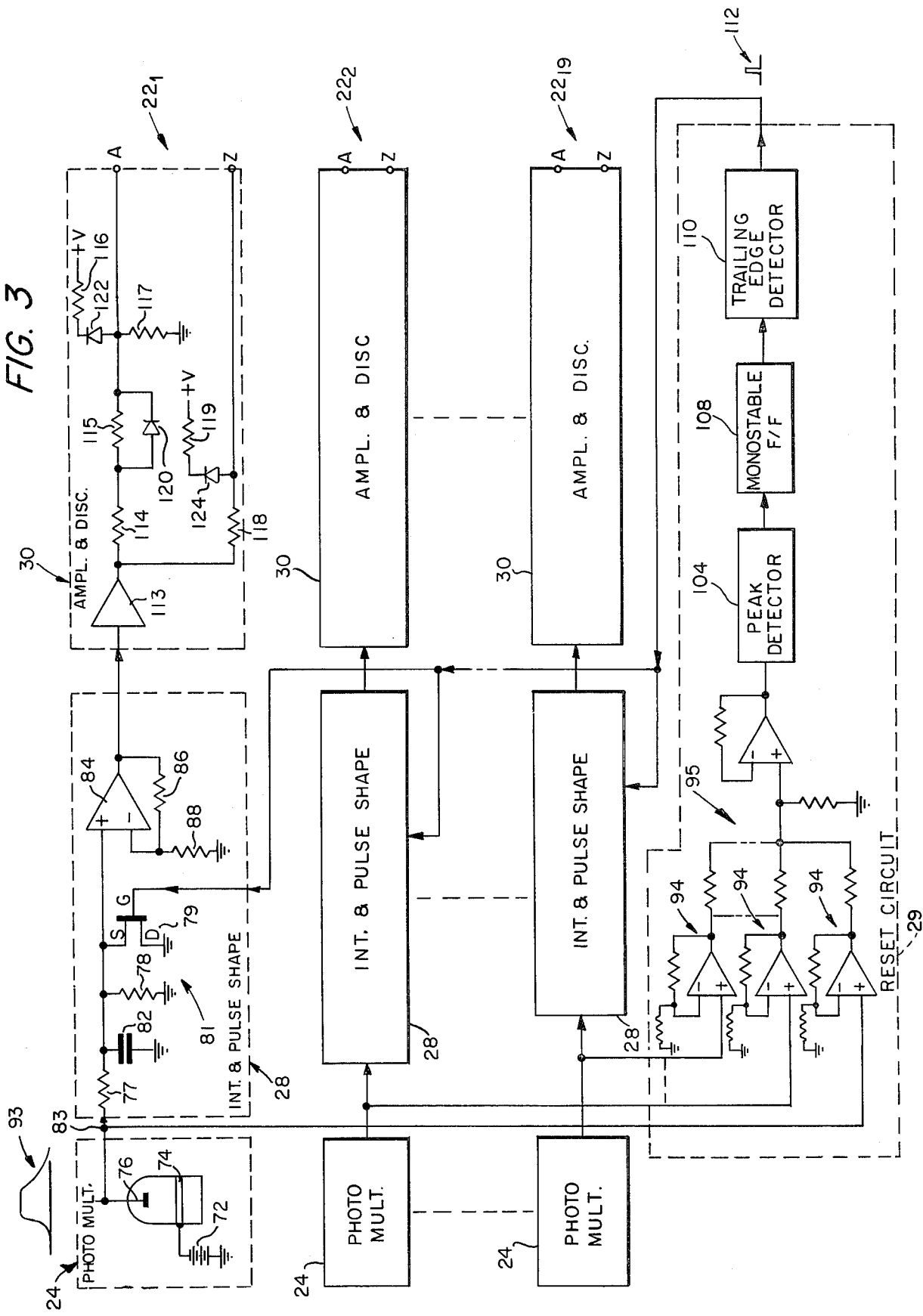
FIG. 3 is a schematic diagram of the electrical circuitry utilized in the integrator, the pulse shaping, and the discriminating circuitry referred to in FIG. 1.
Figures 4, 5:
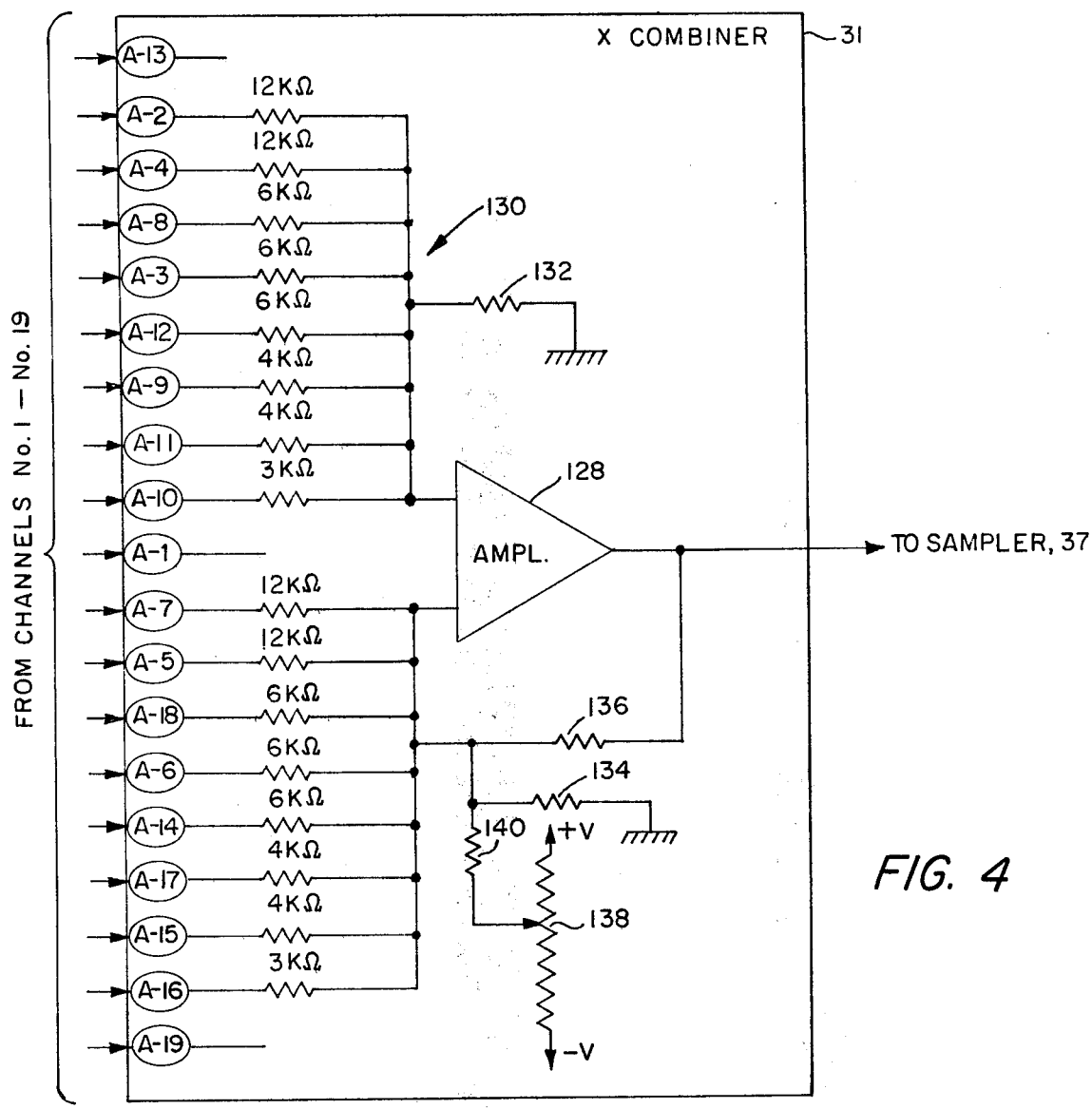
FIGS. 4 and 5 show, respectively, a circuit for combining the pulse signals and a table of resistor values for scaling these signals for the combiner circuits of FIG. 1.

Each of the discriminators 30 is coupled to each of the combiners 31–34 as shown in FIG. 1, with more precise details of the coupling to be seen in FIGS. 3 and 4 which show that each discriminator has a pair of outputs which are coupled in a prescribed manner to the respective combiners 31–34. The combiners 31–34, as will be seen in FIG. 4, are provided with scaling resistors for scaling the contributions of the discriminators 30 in accordance with the geometry of the photomultipliers 24, as will be seen in FIG. 2, to provide signals representing the X component and the Y component of the location of an impact of a gamma ray photon upon the scintillator crystal, the combiner 31 providing the X component and the combiner 32 providing the Y component. The combiner 33 provides a measure of the total energy received by all of the photomultipliers 24 which is used for normalizing the X component and the Y component signals by a factor to make them energy independent. The combiner 33 may be provided with variable scaling resistors which are useful for aligning the system 20 to minimize any distortion appearing in the image on the display 46.

The image on the display 46 is further enhanced by means of the combiner 34 and the analyzer 48, the combiner 34 functioning in a manner similar to that of the combiner 33 to provide a measure of the total energy received by the photomultipliers 24. The analyzer 48 is a well-known pulse height analyzer which provides the aforementioned signal on line 50 in response to signals from the combiner 34 only when the signals indicate that the energy of an impinging gamma ray photon is in excess of a preset minimum energy level and less than a preset maximum energy level, these energy levels being set by the knobs 56 and 58. The samplers 37–39 are triggered in response to the signal on line 50 and provide a sample of the voltages appearing at the outputs of the combiners 31–33, these samples having a duration sufficient to permit the multiplication operation of the scalers 42 and 44. Each of the scalers 42 and 44 are commercially available multiplying units such as that of "Intronics", Model No. 505; the scaler 42 multiplies the output of sampler 37 by the reciprocal of the output of the sampler 39, and the scaler 44 multiplies the output of the sampler 38 by the reciprocal of the output of the sampler 39. The values of the signals from the samplers 37–39 are equal to the values of the signals from the combiners 31–33 which are provided in accordance with the values of the scaling resistors as will be described with reference to FIG. 4.

Referring now to FIG. 2, there is shown an array of the photomultipliers 24 with individual ones of the photomultipliers 24 being numbered to identify their location in the array. The central photomultiplier 24 is numbered 1, the photomultipliers of the inner hexagon are numbered 2 through 7, and the photomultipliers of the outer hexagon are numbered 8 through 19. Also shown in FIG. 2 is a scintillator 60 in the form of a crystal of a material which emits light in response to excitation by high energy radiation, such a material being, for example, sodium iodide with thallium doping. The scintillator 60 is supported in relation to the photomultipliers 24 by means of a housing 62. A collimator 66 having parallel passageways for conducting high energy photons to the scintillator 60 is positioned in front of the scintillator 60 by means of the housing 62 and oriented in the direction of a source (not shown) of high energy radiation.

High energy photons emitted from the source in the direction of the axis of the collimator 66 pass through the passages 68 to illuminate the scintillator 60 in a pattern corresponding to the form of the source. Photons incident upon the collimator 66 in a non-axial direction are substantially absorbed in the material, preferably lead, from which the collimator 66 is fabricated.

A reference frame 70 having an X coordinate axis and a Y coordinate axis may be positioned anywhere upon the array of photomultipliers 24 but is conveniently centered upon the array of photomultipliers 24 such that the Y axis passes through the photomultipliers numbered 19, 1 and 13 while the X axis passes through the photomultipliers numbered 10, 3, 1, 6 and 16. With respect to the X axis combiner 31 of FIG. 1, the signals derived from the photomultipliers are suitably scaled or weighted in accordance with their respective distances from the Y axis. Similarly, with respect to the Y coordinate combiner 32 of FIG. 1, the signals derived from the photomultipliers 24 are suitably scaled or weighted in accordance with their respective distances from the X axis. These weightings will be described subsequently with reference to the table in FIG. 5. While various spacings between the scintillator 60 and the array of photomultipliers 24 may be utilized, it has been found that a spacing in the range of approximately one-half diameter is most advantageous for providing a sharp image on the display 46 of FIG. 1.

Referring now to FIG. 3, each channels $22_1$–$22_{19}$ is seen to have a pair of outputs labeled with the letters A and Z, these terminals being further designated by the numerals 1–19 when it is desired to designate the terminals of a specific one of the channels 22. The terminals A are coupled to the combiners 31–32 in accordance with the interconnections to be seen in FIGS. 4 and 5 while the terminals Z are coupled to the combiners 33–34. Each photomultiplier 24 is energized by a source of electrical power shown as a battery 72 and has its photoelectric electrode 74 being connected to the negative terminal of the battery 72 while the anode 76 of the photomultiplier 24 is connected via a resistor 77 through an integrating network 81 to ground and the positive terminal of the battery 72. The integrating network 81 includes a capacitor 82 with the resistor 78 connected in parallel therewith, as shown. A field effect transistor 79 is also provided with source (S) and drain (D) electrodes connected in shunt across the capacitor 78, as shown. It is noted that by grounding the positive terminal of the battery 72 and coupling the integrating capacitor 82 and the resistor 78 and transistor 79 between the anode 76 and ground, there is provided a substantial reduction in any noise voltage which might appear across the terminals of the capacitor 82. Due to the fact that the output impedance of the photomultiplier 24 is relatively high while the input impedance of the pulse shaper 28 is relatively low, an amplifier 84 with resistors 86 and 88 coupled thereto is connected between the capacitor 82 and the pulse shaper 28 for impedance matching purposes. A terminal of the capacitor 82 is connected to the plus input terminal of the amplifier 84 while the resistor 88 is coupled between the minus input terminal of the amplifier 84 and ground. Resistor 86 serves as a feedback path between the output of the amplifier 84 and its minus input terminal.

The anode 76 of the photomultiplier is also connected to the reset circuit 29 for producing the control signal for the gate electrode (G) of field effect transistor 79 when substantially 90 percent of the light energy produced by the scintillator has been collected by the photomultiplier. In particular, in response to a gamma ray photon a pulse of current is produced by the photomultiplier 24 such current pulse being numbered 93. As shown such pulse is characterized by a period of approximately constant level for approximately 150 ns, followed by a fast decay phase with a time constant of 230 ns and a slow decay mode with a time constant of 1200 ns. Further, the area under the current pulse 93 reaches a substantially constant level 800 ns after the start of such current pulse. That is, 800 ns after the start of the current pulse 90 percent of the light energy is collected by the photomultiplier. The current pulse produces a voltage at terminal 83 which has a peak at substantially the same time as the peak of the current pulse. This voltage is fed to buffer 94 here a high gain amplifier having a feedback resistor, as shown. The voltage pulse is produced at the output of the buffer 94 will peak at substantially the same time as the peak of the current pulse 93 produced by the photomultiplier 24. The voltages produced by the buffers 94 are summed together in summing network 95. The output of network 95 is fed to a peak detector 104. Such detector 104 produces a trigger pulse in response to the peak of the voltage pulse produced by network 94 (and hence at the time the current pulses 93 produced by the photomultipliers 24 peak). Typically, the voltage pulse produced by the network 95 peaks 100 ns after the input of the gamma ray photon on the scintillator. The trigger pulse is fed to a monostable multivibrator (flip-flop) 108 which in response to such trigger signal produces a pulse having a time duration of 700 ns. The trailing edge of the pulse thus occurs 800 ns after the start of the current pulse produced by the photomultiplier or at a time when 90 percent of the light energy is collected by the photomultiplier. It is noted therefore that the level of the signal produced by the integrator starts from an initial reference level, here ground potential and increases to a voltage level which is, to within 10 percent, a measure of the energy of the incident gamma ray photon. The trailing edge of the pulse produced by the monostable multivibrator 108 is then detected by a trailing edge detector 110, such detector 110 producing a control signal (i.e. a short pulse 112) for the gate electrode (G) of the field effect transistor 79 causing a short circuit between the previously open circuit source and drain electrode thereof. Therefore, in response to such produced control signal (i.e. pulse 112) capacitor 78 is short circuited resetting the output of the integrator to its initial reference level, i.e. ground. It is noted that this control signal 112 is fed to all 19 channels $22_1$–$22_{19}$.

Continuing in the description of the integrator and pulse shaper 28, the amplifier and discriminator 30 is seen to comprise a buffer amplifier 113, resistors 114 to 119 and diodes 120, 122 and 124.

The amplitude discrimination is provided by the diode 120 in cooperation with the resistors 115, 117. Pulses from the pulse shaper 28 of relatively small amplitude wherein the amplitude is less than the forward voltage drop of the diode 120 are suppressed. However, pulses from the pulse shaper 28 having a voltage amplitude greater than the forward voltage drop of the diode 120 cause the diode 120 to conduct whereupon the voltage is seen at terminal A. Thus, the signals appearing at terminal A have been selected to be only those signals exceeding a threshold, this being the aforementioned forward voltage drop across the diode 120, while the signals appearing at terminal z include also those signals having too small a value to pass through the diode 120.

While a battery 72 of fixed voltage is shown, it is advantageous to use a variable voltage source in which the voltage is adjusted to provide a predetermined value of signal in the output of the E combiner 24 when the photomultipliers 24 are activated in response to a specific isotope. This provides a normalization of the system 20 for specific isotopes so that the threshold of the discriminator 30 is always at optimal value. In addition, the multiplying factors in the scalers 42 and 44 vary within a predetermined range of magnitudes thereby permitting optimum operation of the scalers 42 and 44.

Referring now to FIGS. 4 and 5, there are shown respectively a block diagram of the combiner 31 of FIG. 1 and a table showing the values of the summing resistors which serve to scale or weight the signals from the channels 22, the table having four rows corresponding respectively to the resistor values of the combiners 31, 32, 33 and 34. The circuitry configurations for each of the four combiners 31–34 are identical; accordingly, only the circuit of the combiner 31 is shown in the figures. As has been mentioned hereinbefore, the X coordinate combiner 31 and the Y coordinate combiner 32 are each coupled to the terminals A1–A19 of the channels 22 while the Z combiner 33 and the E combiner 34 are each coupled to the terminals Z1–Z19 of the channels 22.

The combiner 31 is seen to comprise an amplifier 128, summing resistors 130, a resistor 132 coupling the plus terminal of the amplifier 128 to ground, a resistor 134 coupling the minus terminal of the amplifier 128 to ground, a feedback resistor 136 coupling the output terminal of the amplifier 128 to its minus input terminal for setting the gain of the amplifier 128, and a potentiometer 138 coupled between a positive and a negative source of voltage and coupled to the minus terminal of the amplifier 128 by a resistor 140 for providing an adjustable voltage offset. While there are 19 terminals, A1–A19, only 16 summing resistors 130 are provided for the combiner 31, there being no connection to the terminals A1, A13 and A19, this being indicated by the letters NC in the first row of FIG. 5. The reason for the lack of connection to the terminals A1, A13 and A19 is apparent from the arrangement of the photomultipliers 24 in FIG. 2 wherein it is seen that the correspondingly numbered photomultipliers 24 are located on the Y axis and, accordingly, get a zero weighting with respect to determining position in the direction of the X axis.

Referring to the second row of the table in FIG. 5, it is noticed that in the Y axis combiner 32, there is no connection provided by the signals of five of the photomultipliers 24 and the correspondingly numbered terminals, these being the terminals 1, 3, 6, 10 and 16, the lack of connection being shown in the second row of the table of FIG. 5, the lack of connection being due to the fact that, as is shown in FIG. 2, these five photomultipliers are located on the X axis and, therefore, make no contribution to displacements in the direction of the Y axis.

The values of the summing resistors 130 are in inverse relationship to the distances of the corresponding photomultipliers 24 from a coordinate axis of the reference frame 70 of FIG. 2. Thus, for example, the photomultipliers 24 numbered 2, 4, 5 and 7 are given a value of twelve kilohms in the X combiner 31 since their centers are spaced a half diameter from the Y axis. The photomultipliers 24 numbered 8, 3, 12, 14, 6 and 18 have corresponding resistance values of six kilohms in the X combiner 31 since these photomultipliers have their centers spaced one diameter from the Y axis. The photomultipliers 24 numbered 9, 11, 15 and 17 are provided with resistors having values of four kilohms in the X combiner 31 since these photomultipliers have their centers spaced one and one-half diameters from the Y axis. And, finally, the photomultipliers 10 and 16 have their corresponding resistors being valued at three kilohms in the X combiner 31 since these photomultipliers 24 have their centers spaced at a distance of two diameters of the Y axis. Similar comments apply to the resistors of the Y combiner 32 as shown in the second row of the table in FIG. 5 since the photomultipliers 24 numbered 17, 7, 2, 9, 11, 4, 5 and 15 are spaced at one-half the distance from the X axis of the photomultipliers 18, 19, 8, 12, 13 and 14.

With respect to the combiner 31 of FIG. 4, all of the summing resistors 130 corresponding to photomultipliers 24 of FIG. 2 are located to the right of the Y axis which are coupled to the plus input terminal of the amplifier 128 while the summing resistors corresponding to photomultipliers 24 located to the left of the Y axis are coupled to the minus input terminal of the amplifier 128. This is indicated in the first row of the table of FIG. 5 wherein plus signs are positioned beneath the resistance value for the resistors coupled to the terminals 2–4 and 8–12 while minus signs are positioned beneath the resistance values for the resistors coupled to the terminals 5–7 and 14–18. Similarly, in the second row of the table of FIG. 5, plus and minus signs are positioned beneath the resistance values to indicate that the corresponding resistors are coupled to either of the plus or minus input terminals of the amplifier 128. With respect to the Z combiner 33 and the E combiner 34, all of these summing resistors 130 are coupled to the minus input terminal of the amplifier 128, the plus input terminal being grounded via resistor 132. Variable summing resistors may be utilized for the Z and E combiners 33 and 34, if desired, for more precise adjustment of the weightings accorded the signals from the various photomultipliers 24 to minimize the effects of barrel distortion and nonlinearities in the scintillator 60 to provide a more uniform image on the display 46 of FIG. 1.

It is understood that the above-described embodiment of the invention is illustrative only and that modifications thereof will occur to those skilled in the art. Accordingly, it is desired that this invention is not to be limited to the embodiment disclosed herein but is to be limited only as defined by the appended claims.

What is claimed is:

1. A camera system comprising:
    (a) an array of detectors of radiant energy positioned in a predetermined pattern for receiving such energy, each of said detectors providing a current pulse upon being illuminated with such energy, such current pulse rising from an initial level to a peak level and then returning to such initial level;
    (b) a plurality of integrator means, each one thereof being coupled to a corresponding one of the detectors, each one of such integrators producing a voltage which increases from an initial reference level to a peak level representative of the amount of charge in the current pulse produced by the one of the detectors coupled thereto;
    (c) means responsive to the current pulses produced by the detectors for detecting the peak level of the current pulses and for producing a trigger pulse in response to the detection of such peak level; and (d) means, responsive to the trigger pulse, for resetting the voltage produced by the integrator means to the initial reference level a predetermined time after detection of the peak level of the current pulses.

2. The camera system recited in claim 1 wherein the integrator includes a capacitor and wherein the resetting means includes a transistor having a pair of electrodes coupled in shunt with the capacitor and a control electrode fed by the trigger pulse.

3. A camera system comprising:

(a) an array of photodetectors arranged to locate flashes of light produced by a scintillator in response to an incident gamma ray photon, a current pulse being produced by each one of such photodetectors in response to each incident gamma ray photon, the amount of charge produced by each one of such photodetectors being related to the portion of the energy of the photon detected by such one of the photodetectors, such current pulse rising from an initial level to a peak level and then returning to such initial level;

(b) a plurality of integrator means coupled to a corresponding one of the photodetectors for integrating the current pulses producing a voltage which increases from an initial reference level to a peak level representative of the amount of charge in the current pulse fed thereto, such peak level providing a measure of the portion of the energy of the photon detected by such one of the photodetectors;

(c) means responsive to the voltages for providing the location of flashes of light produced by the scintillator; and, (d) means responsive to the current pulses for detecting the peak level of such current pulses and for resetting the voltage produced by the integrator means to the initial reference level a predetermined time after detection of the peak level of the current pulses.

4. The camera system recited in claim 3 wherein each one of the integrator means includes a capacitor and wherein the resetting means comprises:

(a) means for producing a trigger pulse a predetermined time after detection of the peak level of the current pulses; and, (b) switch means responsive to the trigger pulse for shorting the capacitor of the integrator means.

5. The camera recited in claim 4 wherein the switch means includes a transistor having a pair of electrodes coupled in shunt across the capacitor and a control electrode fed by the trigger pulse.

* * * * *

UNITED STATES PATENT OFFICE
CERTIFICATE OF CORRECTION

Patent No. 4,413,183      Dated November 1, 1983

Inventor(s) Israel Metal and Vincent Berluti, Jr.

It is certified that error appears in the above-identified patent and that said Letters Patent are hereby corrected as shown below:

On Cover Sheet, Item [73] Assignee: Change "Raytheon Company, Lexington, Mass." to --The Machlett Laboratories, Inc., Stamford, Conn.--.

Signed and Sealed this

Third Day of July 1984

[SEAL]

Attest:

GERALD J. MOSSINGHOFF

*Attesting Officer*      *Commissioner of Patents and Trademarks*